: 3,331,661
Patented July 18, 1967

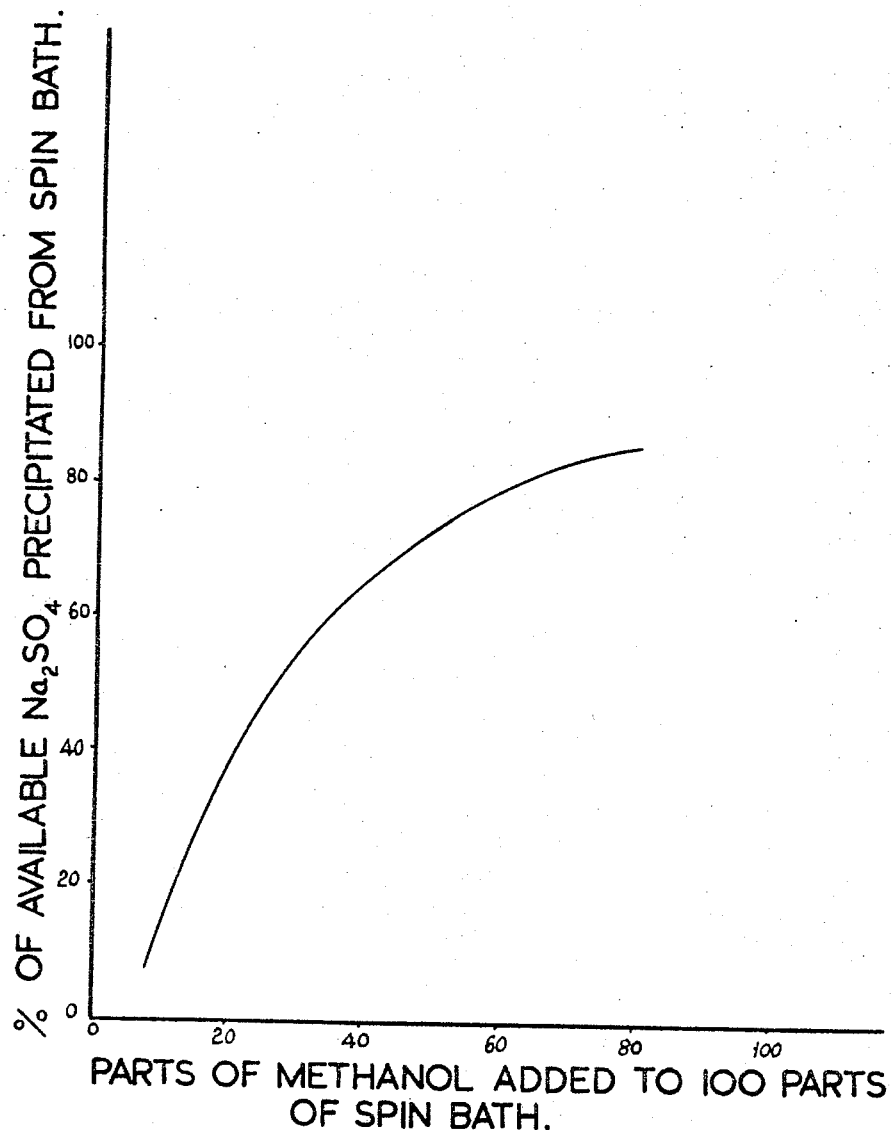

3,331,661
MANUFACTURE OF ANHYDROUS SODIUM SULPHATE
David Anthony Boiston, Camp Hill, Nuneaton, and Desmond Charles Furby Pratt, Balsall Common, near Coventry, England, assignors to Courtaulds Limited, London, England, a British company
Filed Aug. 27, 1963, Ser. No. 304,851
Claims priority, application Great Britain, Sept. 3, 1962, 33,668/62
5 Claims. (Cl. 23—121)

This invention is concerned with the isolation of anhydrous sodium sulphate from a spin-bath liquor of the viscose process.

Sodium sulphate is produced in large quantities by the viscose process. The salt results from the acidification of the alkaline viscose by sulphuric acid, the acid and the salt being the invariable ingredients of the spin-bath liquor. Other ingredients, for example zinc sulphate, may also be present in the liquor during the manufacture of a particular kind of viscose rayon.

The industry has long been interested in recovering sodium sulphate in an anhydrous condition, the only form of the material commanding a market price to make the process of recovery worthwhile. A number of feasible processes have been proposed all of which have two-stages. In the first stage, the liquor at a suitable concentration of sodium sulphate is cooled until a substantial proportion of the salt crystallises and is separated as Glauber's salt. The Glauber's salt is melted in a second stage and then dehydrated by heat or mixing with a precipitant. U.S. patent specification No. 2,482,830 and French patent specification No. 1,015,558 describe two such processes in which anhydrous sodium sulphate is precipitated from a mixture of molten Glauber's salt and a precipitant. Both specifications propose acetone and the lower alcohols as precipitants.

We have devised a single-stage process with a consequent saving of machinery and maintenance.

Accordingly, the present invention is a process for the isolation of anhydrous sodium sulphate from a spin-bath liquor of a viscose process containing sodium sulphate and sulphuric acid, comprising metering the liquor and an alcohol having a boiling point of less than 100° C. in predetermined proportions into a mixture of the liquor and the alcohol maintained at a temperature above 33° C. and below the boiling point of the alcohol, so that anhydrous sodium sulphate is precipitated, withdrawing the mixture through a separator on which the anhydrous sodium sulphate is retained, distilling the alcohol from the separated liquid and recycling the distillate as the whole or part of the alcohol metered to the mixture.

The quantity of the precipitated salt increases with the concentration of the alcohol in the mixture, but the additional yields of the salt obtained from step-wise increases in the alcohol concentration grow steadily worse after the first precipitation has been obtained. It is apparent, therefore, that the process should be run at considerably less than full recovery of the salt, in order to obtain the most favourable balance of the quantity of salt produced and the costs of the process including the heat consumed in recovering the alcohol from the filtrate. A second reason for recovering less salt than that available in the liquor, is that it is easier to obtain a pure product when a proportion of the salt remains in solution in the liquor. The conditions required to precipitate sodium sulphate from its dilute solutions are also those which would encourage the concurrent deposition of zinc sulphate or sodium hydrogen sulphate, both of which may be present in the liquor.

Any of the alcohols, methanol, ethanol and isopropanol are useful in this invention, and a mixture of alcohols boiling at less than 100° C. may also be used, but it is worthwhile noting that acetone cannot be used. Acetone is immiscible to any substantial extent with spin-bath liquors containing more than about 20 percent sodium sulphate and about 10 percent sulphuric acid, the spin-bath composition most commonly employed in the manufacture of staple fibre viscose rayon. Acetone, however, is among the preferred precipitants in the dehydration of Glauber's salt.

Molten Glauber's salt is, of course, a saturated solution of sodium sulphate in water and all the previous processes relating to the manufacture of anhydrous sodium sulphate by precipitation with an added liquid have been limited to treating such saturated solutions. The limitation is not necessary in this process. Although the yield of salt per unit of alcohol in the mixture will increase as the liquor approaches saturation in sodium sulphate, economical manufacture of the salt can be undertaken with unsaturated liquors. The liquor should have a sodium sulphate concentration of at least 20 percent and preferably as high as 24 percent.

In a preferred form, the process is carried out by forming the mixture in a vessel in which a rotary cylindrical filter is partially submerged. Then, after the cake of sodium sulphate is formed on the submerged, rotating cylindrical surface, doctor blades can strip the cake as it rises above the level of the mixture in the vessel. The quality of the salt is improved by washing the cake with alcohol, or the distillate which can contain up to 10 percent of water. The alcohol or distillate may, with advantage, be made alkaline by the dissolution of caustic soda, so that any free sulphuric acid clinging to the cake is neutralised. The washings from this stage of the process may subsequently be made part of the alcohol feed to the mixture.

The efficiency of the process is increased if some of the alcoholic vapour from the distillation of the filtrate is condensed in contact with the mixture, to maintain the temperature of the mixture above 33° C., and preferably in the range of 50° to 70° C., the chosen value depending on which alcohol is used as the precipitant.

The accompanying drawing shows a graph relating the deposition of sodium sulphate with increasing methanol content. The spin-bath liquor on which this determination was made, comprised 28 percent $Na_2SO_4$, 10 percent $H_2SO_4$ and 0.9 percent $ZnSO_4$. The temperature of the mixture was maintained at 50° C., and six determinations at different concentrations of methanol in the mixture, were made. It will be noted that 86 percent of the sodium sulphate was recovered when the mixture comprised 80 parts of methanol to 100 parts of liquor.

What we claim is:
1. A process for the isolation of anhydrous sodium sulphate from a spin-bath liquor of a viscose process, said liquor containing both sodium sulphate and sulphuric acid, which comprises metering a stream of the liquor and a stream of an alcohol having a boiling point of less than 100° C. into a mixture of liquor and alcohol maintained at a temperature above 33° C. and below the boiling point of the alcohol metered into said mixture, the proportions of liquor and alcohol metered into said mixture being sufficient to precipitate anhydrous sodium sulphate from the augmented mixture, separating anhydrous sodium sulphate from the augmented mixture to leave a mother liquor, distilling alcohol from said mother liquor and recycling the distillate to form at least part of the alcohol metered into the mixture first referred to.

2. A process as claimed in claim 1 where the alcohol is methanol.

3. A process as claimed in claim 1 comprising containing the liquid mixture in a vessel in which a rotary cylindrical filter is partially submerged in the liquid, forming a cake of anhydrous sodium sulphate on the submerged rotating cylindrical surface and then removing the anhydrous sodium sulphate from the filter out of contact with the liquid.

4. A process as claimed in claim 3 where the sodium sulphate after removal from the separator is washed with alcohol having a boiling point less than 100° C.

5. A process as claimed in claim 4 where the alcohol wash liquor is made alkaline by the dissolution of sodium hydroxide.

References Cited

UNITED STATES PATENTS 873,070  12/1907  Nibelius _____ 23—121 X

OSCAR R. VERTIZ, *Primary Examiner.*

EARL C. THOMAS, *Examiner.*